(12) United States Patent
Storaasli

(10) Patent No.: US 9,337,712 B2
(45) Date of Patent: May 10, 2016

(54) ECCENTRIC MAGNETIC GEAR SYSTEM BASED ON REPULSION

(76) Inventor: Allen G. Storaasli, Federal Way, WA (US)

( * ) Notice: Subject to any disclaimer, the term of this patent is extended or adjusted under 35 U.S.C. 154(b) by 405 days.

(21) Appl. No.: 13/411,596

(22) Filed: Mar. 4, 2012

(65) Prior Publication Data

US 2012/0223606 A1 Sep. 6, 2012

Related U.S. Application Data

(60) Provisional application No. 61/449,134, filed on Mar. 4, 2011.

(51) Int. Cl.
*H02K 51/00* (2006.01)
*H02K 49/10* (2006.01)

(52) U.S. Cl.
CPC ............ *H02K 49/102* (2013.01); *H02K 49/104* (2013.01); *H02K 51/00* (2013.01)

(58) Field of Classification Search
CPC ... H02K 49/102; H02K 49/104; H02K 51/00; H02K 49/10
USPC ........... 310/82, 83, 92, 99, 103; 475/149, 163
See application file for complete search history.

(56) References Cited

U.S. PATENT DOCUMENTS

| | | | |
|---|---|---|---|
| 3,523,204 A | 8/1970 | Rand | |
| 3,573,517 A * | 4/1971 | Osterstrom | H02K 49/108 310/103 |
| 4,627,593 A * | 12/1986 | Salter | F16L 3/2053 248/561 |
| 5,013,949 A | 5/1991 | Mabe | |
| 5,204,572 A | 4/1993 | Ferreira | |
| 5,569,111 A | 10/1996 | Cho | |
| 5,569,967 A | 10/1996 | Rode | |
| 5,712,519 A | 1/1998 | Lamb | |
| 5,902,185 A | 5/1999 | Kubiak | |
| 5,903,205 A | 5/1999 | Goto | |
| 6,047,456 A | 4/2000 | Yao | |
| 6,054,788 A * | 4/2000 | Dombrovski | H02K 49/00 310/103 |
| 6,369,477 B1 | 4/2002 | Bonin | |
| 7,421,929 B2 | 9/2008 | French | |
| 7,471,024 B2 | 12/2008 | Park | |
| 7,608,961 B2 | 10/2009 | Wise | |
| 8,210,980 B2 * | 7/2012 | Gravio | F16H 49/005 310/103 |
| 2002/0047411 A1 | 4/2002 | Mo | |
| 2008/0024017 A1 | 1/2008 | Chen | |
| 2010/0207472 A1 | 8/2010 | Atallah | |

(Continued)

OTHER PUBLICATIONS

Jorgensen, Frank T. "The Cycloid Permanent Magnetic Gear" IEEE Transactions on Industry Applications (vol. 44, No. 6) Nov./Dec. 2008.

*Primary Examiner* — John K Kim
(74) *Attorney, Agent, or Firm* — Dean A. Craine

(57) ABSTRACT

An eccentric magnetic, non-contacting gear system which can affect shaft speed and torque while minimizing mechanical friction and wear has bi-axial shafts. This efficient, non-contacting gear system can be produced by the interaction of circular arrays (or pitch circles) of permanent magnets with eccentric engagement. Coupling is provided by magnetic field repulsion. Input torque is applied to a circular array of permanent magnets representing a first gear, which then through magnetic fields, not physical contact, transfers the torque to another circular array of permanent magnets representing a second gear having an offset output shaft. Gearing may be done in one step or in stages.

5 Claims, 4 Drawing Sheets

(56) References Cited

U.S. PATENT DOCUMENTS

2010/0237731 A1* 9/2010 Gravio .................. F16H 49/005
                                                            310/103
2011/0266902 A1* 11/2011 Whitfield ............... B63H 23/22
                                                            310/103
2012/0223606 A1* 9/2012 Storaasli ....................... 310/103

* cited by examiner

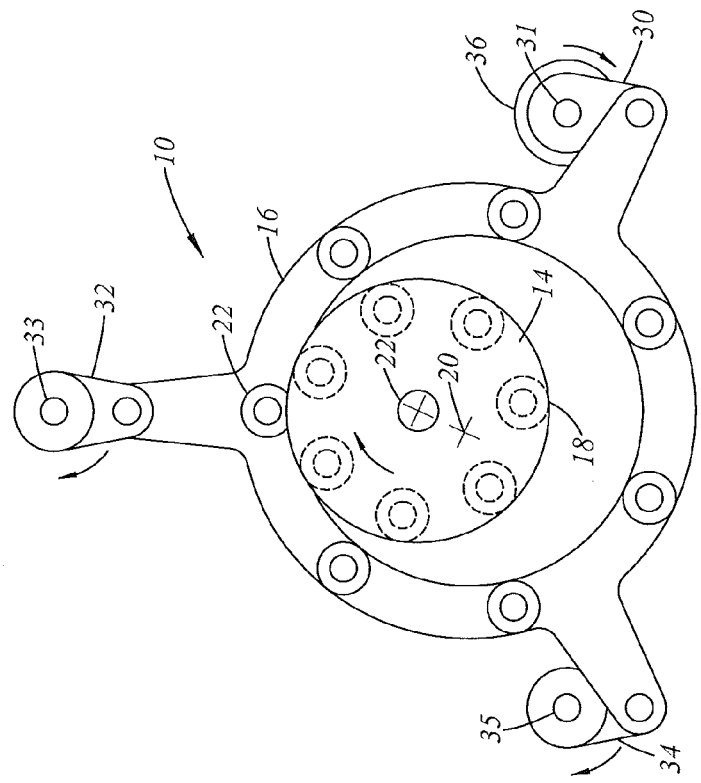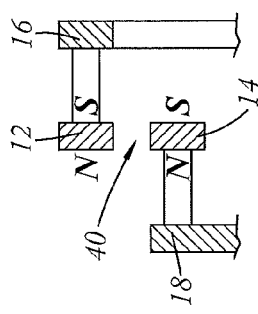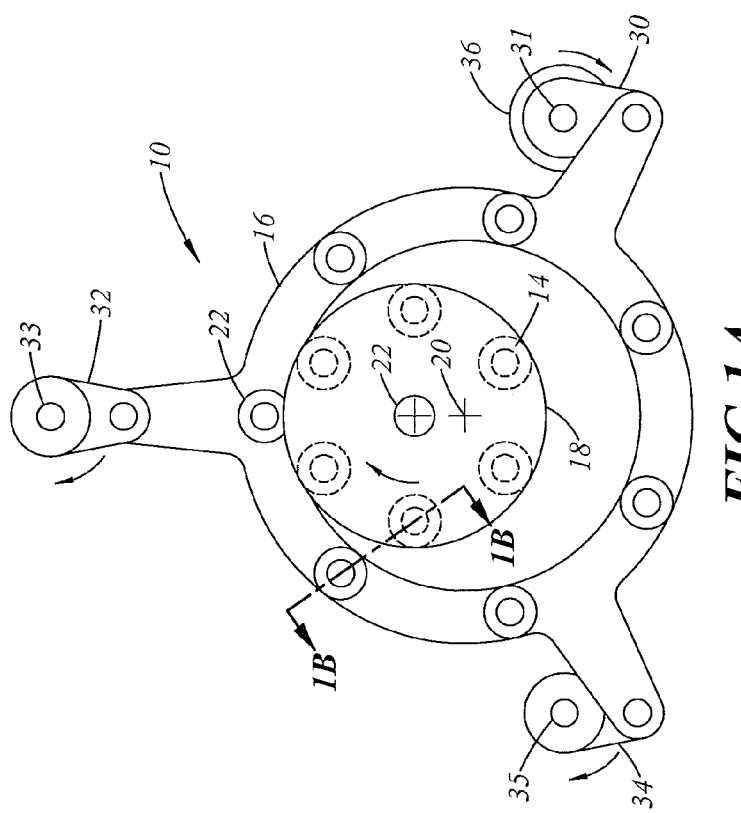

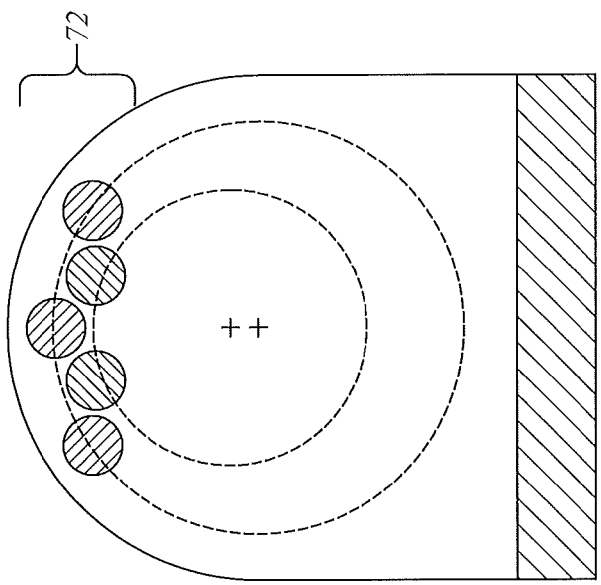
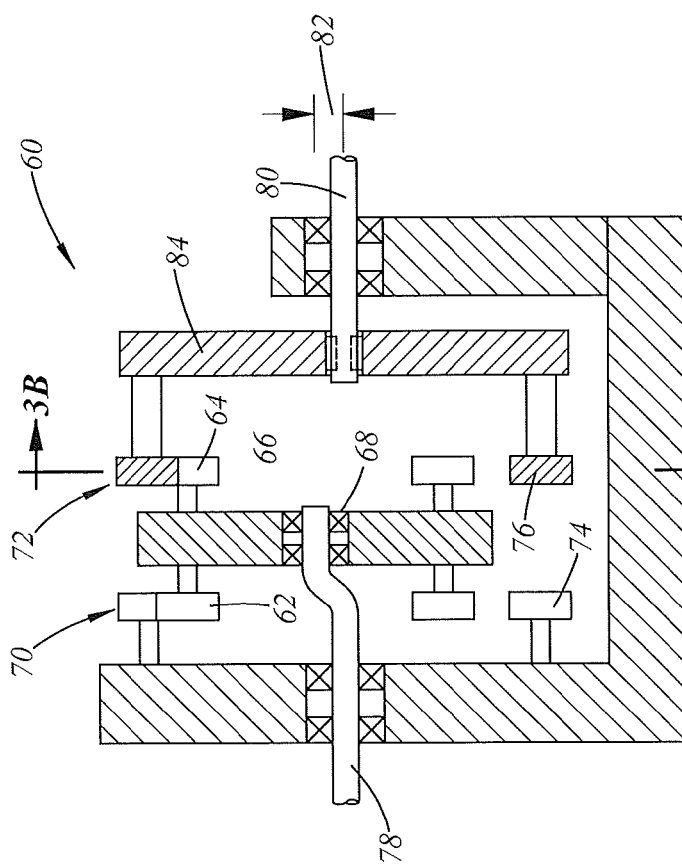

ECCENTRIC MAGNETIC GEAR SYSTEM BASED ON REPULSION

RELATED APPLICATIONS

This application is related to and claims priority under 35 U.S.C. 119(e) to U.S. provisional application Ser. No. 61/449,134, entitled "Eccentric Magnetic Gear System," filed on Mar. 4, 2011, with inventor Allen G. Storaasli of Federal Way, Wash., which is hereby incorporated by reference in its entirety.

FIELD OF THE INVENTION

This invention pertains generally to gear systems and more specifically to an eccentric, magnetic, non-contacting gear system which can affect shaft speed and torque while minimizing mechanical friction and wear.

BACKGROUND OF THE FIELD

Traditional gear systems are used to reduce or increase rotational shaft speed, along with resulting effect on shaft torque. A typical application for such a gear system is to a weak electrical motor in order to increase shaft torque. However, with a traditional gear system, there are often mechanical limitations due to, e.g., friction, wear, and temperature sensibility. Temperature changes can degrade gear mesh geometry and lubrication properties. These problems could be minimized, if not eliminated entirely, by using non-contacting, magnet elements in the gear system. Another benefit could be reduced mechanical and torque noise.

Biaxial gear systems have been previously patented, such as in U.S. Pat. Nos. 3,523,204 (to Rand Aug. 4, 1970) and 6,047,456 (to Yao et al. Apr. 11, 2000). The biaxial gear systems in these patents are inefficient and also likely have torque cogging problems when torque transmission loads are low.

In other applications, internal gear topology causes a higher number of magnet interactions between the drive and driven gears, which aids torque capability. Frank Jorgensen, in his article "The Cycloid Permanent Magnetic Gear," IEEE Transaction on Industry Applications, November 2008, shows effectiveness of such magnetic gearing with cycloidal arrangement. The magnets are arranged such that at the region of closest approach, non-contacting, strong magnetic attractive forces are developed. As a result, there is a strong rotation transmission torque along with high torsional stiffness. The article details the analysis used to estimate the torque transmission characteristics; however, it does not address the high radial forces which must be reacted by the support bearing sets. It is apparent to those skilled in the art that the high bearing loads, which are constant at all speeds, can have serious effects on torque efficiency. In addition, highly loaded bearings are subject to wear-out.

SUMMARY OF THE INVENTION

The present invention solves the above-mentioned problems by providing an efficient, non-contacting gear system produced by the interaction of circular arrays (pitch circles) of permanent magnets with eccentric (also called cyloidal) arrangement. Unlike prior art, coupling is provided by magnetic field repulsion. Torque may be inputted into the system from a motor, such as a weak electrical motor, through idler links, an input shaft or some other appropriate method. The torque is applied to a circular array of permanent magnets representing a first gear, which then through magnetic fields, not physical contact, transfers the torque to another circular array of permanent magnets representing a second gear having an offset output shaft. Gearing may be done in one step or in stages.

Unlike in the prior art, the present invention may comprise generally cylindrical, axially polarized magnets which are spaced apart from each other with significant gaps. All magnet fields in both, or all, arrays have the same axial orientation (conventionally referred to as N and S). When the pitch circles of the two arrays are brought into tangential, non-touching intersection (called the tangential mesh area), the magnet-to-magnet repulsion establishes a condition tending to avoid magnet-to-magnet contact, thereby enabling torque transmission in the tangential direction. This "magnetic meshing engagement" of the two arrays may be compared to traditional gear mechanical engagement, except there is no mechanical contact. Some radial forces also result which must be reacted by the support bearings. These radial forces are much less than in the prior art. Because the resultant bearing torques are much lower, the system efficiency is improved. This should be most noticeable at low rotational speeds and low torque transmission levels. Low speed aggravates prior art because bearing lubrication film thickness is reduced, allowing metal-to- metal contact between the balls and races.

Motorized spacecraft positioners operate at low speeds and reversing directions. The term 'direct drive' has always signified a simple motor on an axis with no gearing. The present invention enables the use of a motor with amplified torque using simple, reliable, non-contacting gearing and may be considered as nearly equivalent to a direct drive, but now with increased torque output for the same weight.

BRIEF DESCRIPTION OF THE DRAWINGS

FIG. 1A is a front view of a first embodiment having an eccentric arrangement of magnetic elements with offset (parallel but non-coaxial) axes;

FIG. 1B is a sectional side view of two adjacent magnets (from different pitch circles) from FIG. 1;

FIG. 1C is a front view of another embodiment having an eccentric arrangement of magnetic elements with offset (parallel but non-coaxial) axes with equal number of magnetic elements in the first and second magnet sets.

FIG. 3A is a side view of a second embodiment using a compound planetary arrangement with a small number of magnets for achieving higher gear ratios;

FIG. 3B is a partial sectional front view showing the non-touching meshing engagement of one gearing stage of said second embodiment;

DETAILED DESCRIPTION

Figure 2:
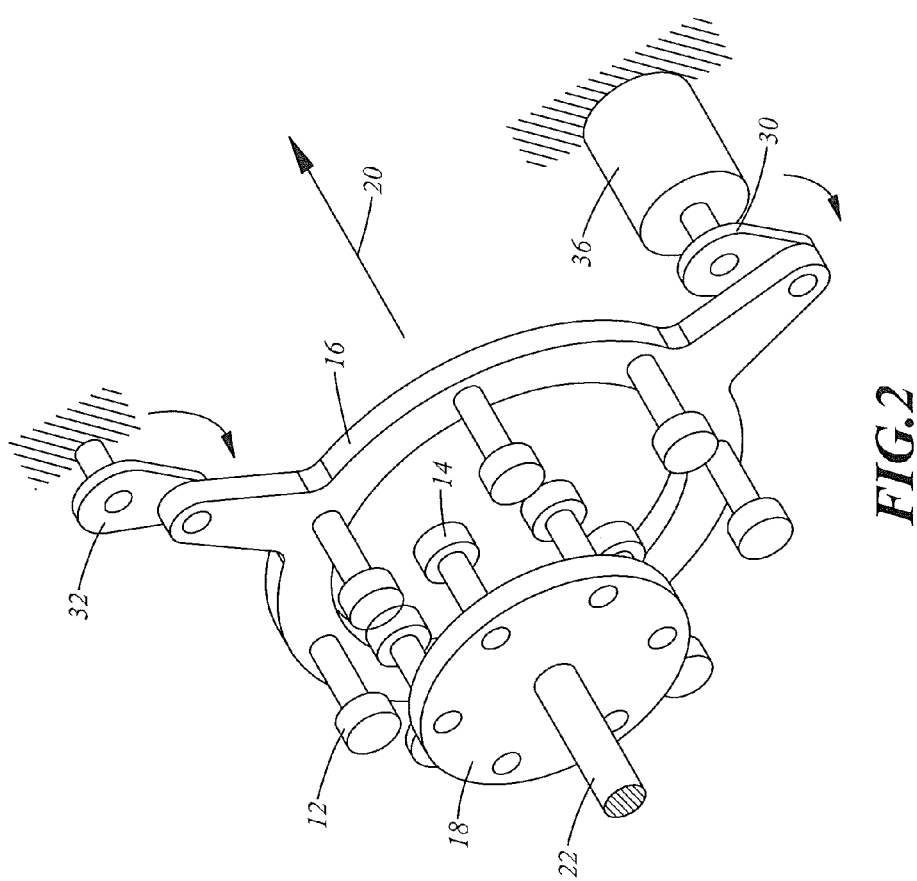
FIG. 2 is a perspective view of FIG. 1.

The objects, features, and advantages of the present invention will be apparent to one skilled in the art from reading the following description in which:

FIG. 1A shows a first embodiment of the invention of the eccentric magnetic gear system 10 that may comprise a first generally circular input magnet set (first pitch circle) 12 interdigitally meshed with a second generally circular output magnet set (second pitch circle) 14. The pitch circles have different diameters to provide for precessing of the tangential mesh area 40. In this embodiment, the input magnet set 12 has seven magnets evenly spaced around the circumference of and attached to input carrier plate 16 and represents a first (input) gear. (As can be seen in FIGS. 1B and 2, these magnets are typically offset axially from the carrier plate 16.) The output magnet set 14 represents a second gear and is spaced evenly around and attached to output carrier plate 18 which itself is arranged around and linked to output shaft 22 that is laterally offset (generally parallel but non-coaxial) from the input axis 20 of the input carrier plate 16. In this embodiment there are 6 magnets in the output magnet set 14.

On the input carrier plate 16 is mounted the first set of magnets 12, and the carrier plate 16 is itself constrained to move in orbital cycloidal motion (not rotational) by the linkage nature of the three idler links 30, 32, 34. The three links 30, 32, 34 are mounted on three fixed posts 31, 33, 35, and the imaginary longitudinal input axis 20 passes axially through the geometric center of the circle described by magnet set 12. The motor torque is input to the carrier plate 16 by an input motor 36 through an input shaft 31 that attaches to motor link 30 (one of the idler links) from an odd number of points, e.g., through the single point 30 or also through the idler cranks 32, 34 if they are affixed to the motor 36. The carrier plate 16 translates in an orbital, cycloidal fashion and causes the closest gap (tangential mesh area 40) between the two meshed magnet sets 12, 14 to advance, thereby spinning the second gear 18 (output carrier plate 18) and the output shaft 22.

The differential between the number of magnets in the input magnet set 12 and the output magnet set 14 set determines the gear ratio of the overall system 10. If the number of inner magnets were equal to the number of outer magnets, the gear ratio would be 1:1, and the system would represent simply a magnetic direct drive coupling. Varying the number of magnets in one magnet set results in a fairly large gear ratio. In the embodiment shown, seven input magnets linked to the input carrier plate 16 and six output magnets linked to the output carrier plate 18—and thus the output shaft 22—result in a gear ratio of 6:1.

As has been previously mentioned, motor function can be added to links 32 and 34, if desired, to increase input torque and/or improve system reliability relative to motor drive failure or motor open winding. All magnets in this system are polarized axially with like poles (conventionally labeled as N and S) in a common direction, as is illustrated in FIG. 1B. FIG. 1B also shows the gap between magnets from different sets (12 and 14). There must be a gap to ensure non-touching, but the magnets must be within the magnetic field of one another to benefit from repulsion. FIG. 1B illustrates the tangential mesh area of the magnets of the two pitch circles-both input and output. As the input carrier plate 16 moves cycloidally, this tangential mesh area 40 precesses around the pitch circles. When properly indexed, the two pitch circles can be generally co-planar, and there still will be no metal-to-metal contact.

FIG. 2 shows the basic system of FIG. 1 in a perspective view. It can easily be seen in this figure that the motor link 30 and idler links 32, 34 are generally coplanar (but slightly offset) with the carrier plate 16. In variations on this embodiment, the links could be further offset from the carrier plate to accommodate different configurations. The input magnets 12 are arranged around the carrier plate 16 and are spaced from the face of the carrier plate to provide clearances for the physical components while keeping the magnets of both input and output sets within the magnetic fields of each other. Likewise the magnets of the output set 14 are spaced axially from the end of the output carrier plate and output shaft.

FIG. 3A shows a second embodiment 60 that can be used to achieve even higher gear ratios. This embodiment also eliminates the use of idler linkages (such as 32 and 34 in the first embodiment). This second embodiment has two stages of interdigitally meshed gearing in a compound epicyclic arrangement, similar to conventional gearing but having no mechanical contact. This second embodiment also makes use of a stepped input shaft having a standing portion which is generally coaxial with the output shaft. The stepped portion of the input shaft passes through the center of the input carrier plate 66 using conventional bearings 68. The orbiting magnet sets 62 and 64 are mounted on carrier plate 66—the first generally circular orbiting magnet set 62 mounted on a first face of said carrier plate, defining the first gearing stage, and the second generally circular orbiting magnet set 64 mounted on the opposing face of said carrier plate, defining the second gearing stage. The carrier plate 66 is the input to the overall system and is constrained to move in a cycloidal fashion by the stepped input shaft 78 and the fixed magnets 74. The mesh areas shown as 70 and 72 (better seen in the sectional view of FIG. 3B) denote areas where the magnet sets are interdigitally meshed (i.e., orbiting set 62 with generally circular fixed set 74 and orbiting set 64 with generally circular rotational set 76); meshing (but non-touching) gear sets use the same repulsive forces described in the first embodiment to spin the output plate 84 and thereby the output shaft 80. Also as in the first embodiment, the speed of the output shaft 80 is increased or reduced greatly by proper choice of magnet ratios.

In FIG. 3A, the fixed magnet set 74 defines a geometric center, and the standing part of the input shaft 78 passes through this geometric center. The input shaft 78 then steps through a prescribed offset 82, and the stepped portion of the shaft passes through the center of the input carrier plate 66. The offset 82 (between the longitudinal axes of the standing part of the input shaft 78 and the output shaft 80) is sized to cause proper interdigital engagement of meshing magnet sets. The interdigital (or tangential) meshing of two magnet circles (pitch circles) of different diameters allows torque transmission at the mesh area of magnetic engagement. As the mesh area/engagement region precesses with carrier rotation there is a relative angle change between the magnet sets. The magnet complement shown in FIG. 3A results in 35:1 speed reduction from input shaft 78 to output shaft 80. One advantage of this system may be that a motor gearhead designed with a low torque motor can have that torque multiplied 35 times for the same input power.

Figure 4B:
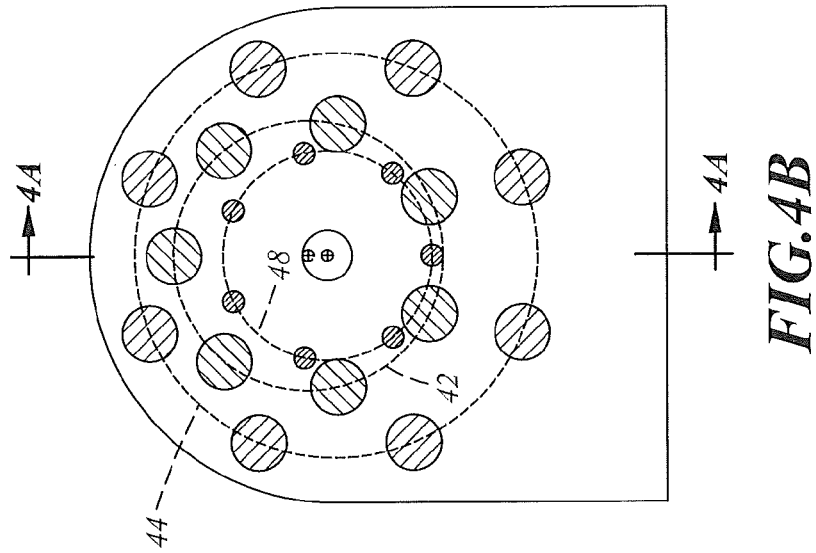
FIG. 4B is a front sectional view of this third embodiment taken at the tangential intersection plane.
Figure 4A:
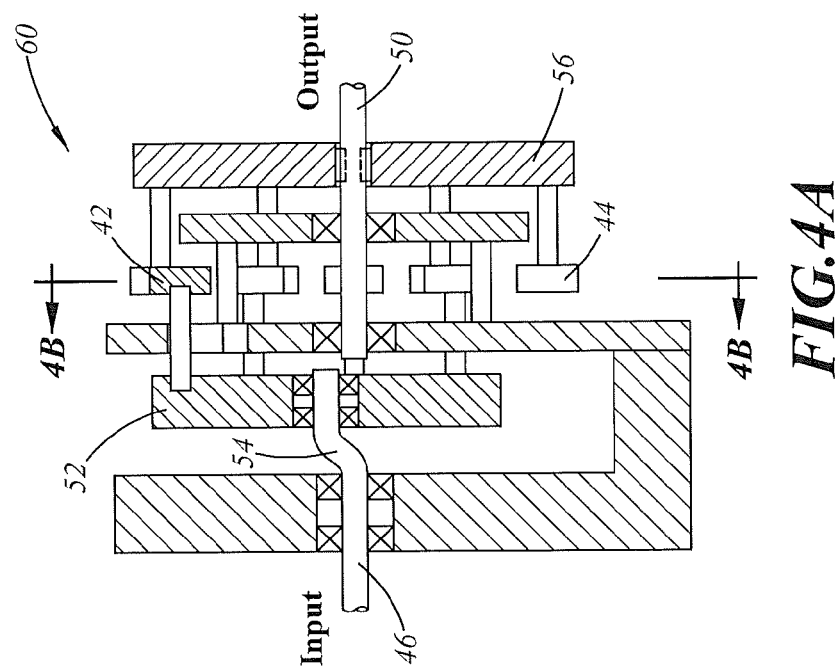
FIG. 4A is a side view of a third embodiment.

FIG. 4A shows a third embodiment 40 that can be used to achieve a moderate gear ratio using less axial space. This embodiment has a stepped input shaft as in the previous embodiment but only one gearing stage. As in the previous embodiment, the standing portion of the input shaft lies along the longitudinal axis of the overall system and then steps through a prescribed offset so that the stepped portion passes through the center of the input carrier plate. In this third embodiment, all magnets are interdigitally meshed in one common plane (as represented in FIG. 4A as section cut 4B), including input magnet set 42, which is linked to input shaft 46, and output magnet set 44, which is linked to output shaft 50. Note that in the first embodiment of FIGS. 1A, 1B, and 2, idlers 32 and 34 are required to constrain orbital motion of the input carrier plate. In this third embodiment 40, the intermediate fixed magnet set 48, having the same number of magnets as the input magnet set 42, provides rotational constraint of the input carrier plate 52 and causes it to move in a cycloidal motion.

Input magnet set 42 (sometimes referred to as the input pitch circle), consisting of seven magnets mounted on input carrier plate 52, follows input motion; the center of the pitch circle translating in a circle due to the step 54 in the input shaft 46. Intermediate fixed pitch circle 48 consisting of seven magnets, interacts magnetically with input pitch circle 42 (best seen in FIG. 4B). The repulsion among the orbiting magnets of input pitch circle 42 and the fixed magnets of intermediate pitch circle 48 causes input pitch circle 42 to orbit cycloidally without rotating, thereby eliminating the need for idler cranks that were used in the first embodiment. The input shaft 46 supplies input torque to the input carrier plate of the magnetic system.

The orbiting path of input pitch circle 42 now causes output pitch circle 44 to rotate as output, rotating output carrier plate 56 (on which output magnet set 44 is mounted) and output shaft 50. Again, as in the second embodiment, the tangentially meshed area will precess around the system with input. Output pitch circle 44 has eight magnets and is linked to output shaft 50. Therefore speed is reduced, and mechanical advantage is gained. The three pitch circles all have different diameters to allow for the precessing of tangential mesh areas.

What is claimed is:

1. An eccentric, magnetic gearing system, comprising:
   a motor with a rotating input shaft;
   an input carrier plate includes a center input axis and is coupled to said input shaft so that when said input shaft is rotated, said input carrier plate moves in an orbital cycloidal motion around said central input axis, said input carrier plate includes a first magnet set that includes a number n of permanent magnets are axially aligned with said input shaft and arranged in a circular co-planer first pitch circle with their N-S poles oriented in the same direction,
   an output shaft; and,
   an output carrier plate coupled to and coaxially aligned with said output shaft, said output carrier plate includes a second magnet set arranged in a circular co-planer second pitch circle that includes a m number of permanent magnets oriented axially with said output shaft and with their N-S poles aligned in the same direction as said permanent magnets in said first set of magnets, said second pitch circle being a diameter different from said first pitch circle, said output carrier plate configured so that when said output carrier plate and said input carrier plate are coaxially aligned and in close proximity in a tangential mesh area, said permanent magnets in said first pitch circle set and said permanent magnets in said second pitch circle are configured and aligned with their N-S poles facing same directions so that when said input shaft is rotated, at least one of said permanent magnets in said second pitch circle-and at least one said permanent magnet in said first pitch circle cross in said tangential mesh area and produce a sufficient magnetic repulsion force that couples the rotational movement of said input shaft to said output carrier plate and causes said output shaft to rotate.

2. The system of claim 1, wherein the number of n permanent magnets in said first circular magnet set is equal to the number of m permanent magnets in said second circular magnet set.

3. The system of claim 1, wherein the number of permanent magnets in said first circular magnet set is greater than the number of permanent magnets in said second circular magnet set.

4. The system of claim 1 wherein said input shaft is linked to at least one idler link attached to said input carrier plate and configured to move said input carrier plate in an orbital cycloidal motion around said central input axis when said input shaft is rotated.

5. The system of claim 1, further including at least three idler links connected to said input carrier plate, at least one of said idler link coupled to said input shaft and configured to move said input carrier plate in said orbital cycloidal motion around said central input axis.

* * * * *